March 5, 1940.  E. WILLIAMS  2,192,725
REVERSIBLE COLLAPSIBLE SCISSORS
Filed May 7, 1938
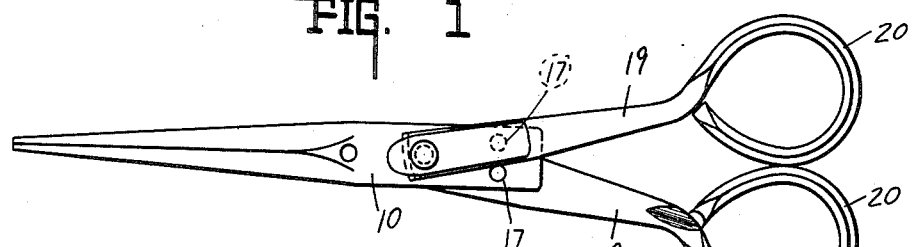
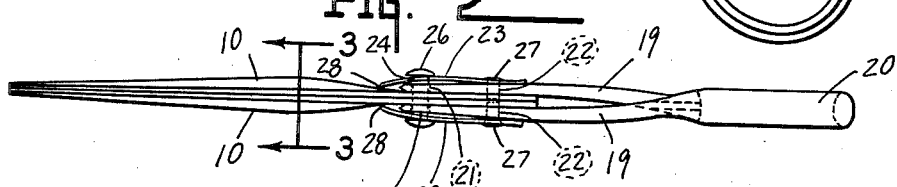
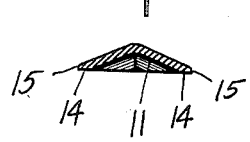
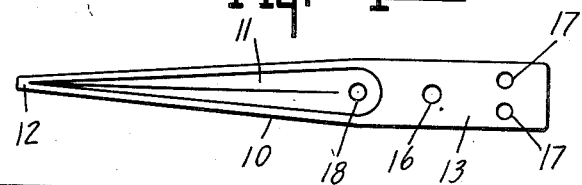
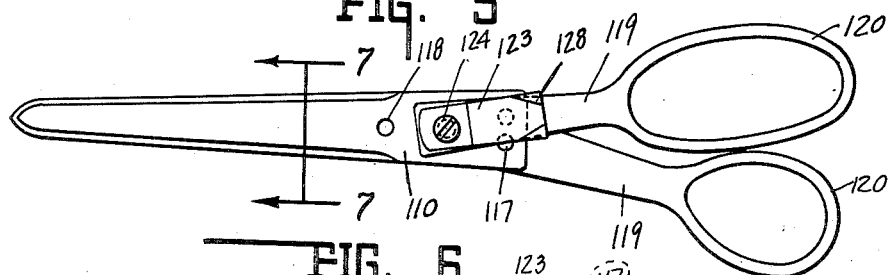
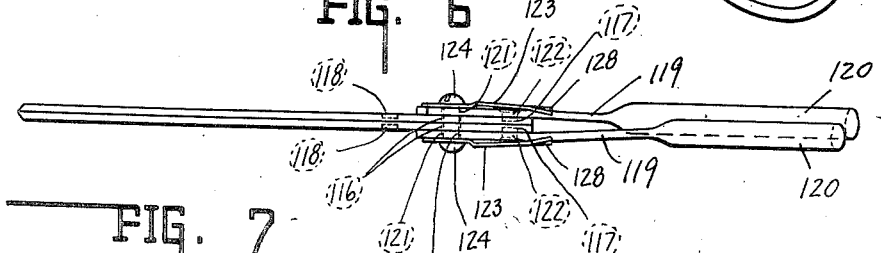
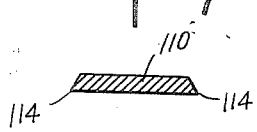
INVENTOR.
ELLSWORTH WILLIAMS.
BY Lockwood, Goldsmith & Galt,
ATTORNEYS.

Patented Mar. 5, 1940

2,192,725

UNITED STATES PATENT OFFICE 2,192,725

REVERSIBLE COLLAPSIBLE SCISSORS

Ellsworth Williams, Danville, Ill.

Application May 7, 1938, Serial No. 206,511

7 Claims. (Cl. 30—255)

This invention relates to a collapsible as well as reversible scissors structure.

The chief object of this invention is to provide a scissors structure which can be readily collapsed for travelling purposes and the like, and which can be reversed for either or both of the following reasons;—to provide another and sharp cutting edge and/or to be readily adapted to right as well as left handed persons.

Another object of the invention is to provide an improved blade structure.

The chief feature of the invention consists in constructing a pair of scissors whereby the aforesaid objects are accomplished, and all of the movements are coincident with the pivotal connection between the blades.

Other objects and features will be pointed out more fully hereinafter.

The full nature of the invention will be understood from the accompanying drawing and the following description and claims:

In the drawing, Fig. 1 is a plan view of a pair of shears or scissors embodying the invention.

Fig. 2 is a side view thereof.

Fig. 3 is an enlarged transverse sectional view of the upper cutting blade and is taken on line 3—3 of Fig. 2 and in the direction of the arrows.

Fig. 4 is a plan view of the interior or cutting face of the cutting blade.

Fig. 5 is a view similar to Fig. 1 and of a modified form of the invention.

Fig. 6 is a view similar to Fig. 2 but of the modified form of the invention.

Fig. 7 is a sectional view of the upper blade shown in Figs. 5 and 6, and is taken on line 7—7 of Fig. 5 and in the direction of the arrows.

In the drawing Figs. 1 to 4 illustrate one embodiment of the invention and in said drawings 10 indicates a blade member and inasmuch as both blade members are identical, a description of one will suffice for both. The blade, as shown in section in Fig. 3, is recessed or grooved as at 11 throughout a major portion of its length but is not grooved at the tip as indicated at 12, nor at the rear end thereof as indicated at 13. The latter portion is substantially flat. The blade in effect is of triangular shape in cross section and, of course, may be solid. For effective cutting, however, solidity is not required. The two shearing edges are designated by the numeral 14 and the faces adjacent thereto are designated by the numeral 15.

Each of the blades includes an opening 16 a short distance from the end opposite the tip. Adjacent the end opposite the tip and equidistant from the opening 16, is a pair of spaced openings 17. These, if desired, may be recessed. The same distance from the opening 16 and toward the tip 12 is an opening 18. This also may be of recess character.

There is provided a pair of handle members 19 terminating in the loop portions 20 which are so arranged that when the handle members are associated with the blade members the loop portions 20 normally strike when brought together.

Each handle member includes an opening 21 and each handle member supports a pin 22. The opening 21 is spaced from the pin 22 a distance, the same as that which openings 17 are spaced from opening 16 or opening 18 is spaced from opening 16.

In this form of the invention there is provided a pair of leaf or flat springs 23 apertured as at 24 and a rivet 25 having the head portions 26 extends through the openings 24 in the spring members 23 and the openings 21 in the handle members 19 and the openings 16 in the blades 10, thus permanently securing all of said members together upon a common and pivotal axis.

The spring 23 is anchored, in the present form of the invention, by the pin 22, as indicated at 27. The opposite end of the spring is directed toward the blade and the end 28 thereof engages the blade 10 and bears thereon. The resulting arrangement is such that each handle member may forcibly be moved with respect to the blade member but in normal cutting operation each handle member and its associated blade member move as a unit. When so associated together, the pin 22 seats in the selected opening 17 of the associated blade member.

In order to reverse the shears so as to utilize the other pair of cutting edges of the blade members, each handle member 19 is elevated against the tension of spring 23 until the pin 22 is freed from the opening 17 previously occupied and is positioned in the other and adjacent opening 17 in the same blade. Both handles are so adjusted. This constitutes in effect, therefore, a reversible shear structure.

Whenever it is desired to collapse the structure, the same procedure is followed, except that instead of positioning pin 22 in either of the openings 17, the handle is turned on the pivot 25 until the handle 19 registers with the blade 10 and the pin 22 seats in the opening 18. The shears are then yieldingly retained in the collapsed relation. The end 28 of the spring at this time bears upon the flat portion 13 immediately adjacent the edge or at the end opposite the end 12.

In Figs. 5 to 7, inclusive, there is illustrated a modified form of the invention and in this form of the invention numerals of the one hundred series indicate like or equivalent parts. Each of the blades 110 include pin receiving recesses 118. Each blade includes the cutting edges 114. Each handle member 119 includes the loop portion 120 but these as shown in Fig. 5 are of dissimilar character, one being the finger receiving loop and the other being of the thumb receiving loop. Reference will be had thereto hereinafter.

Each handle member 119 mounts a pin 122 and is apertured as at 121 to receive the common pivotal retainer 125. Each blade member is apertured as at 116 also to receive the same. A spring member 123 is anchored as at 124 and bears as at 128 upon the handle member. Each blade member is provided with a pair of recesses 117 spaced apart and equidistant from the opening 116, the recess 118 being oppositely spaced from opening 116 the same distance. The pin 122 is spaced from the opening 121 the same distance. This form of the invention is of the recess type as distinguished from the openings passing entirely through the several members. This form of the invention differs from that first described in that the handle portions are not identical and, therefore, the shears can be adjusted for right and left handed persons. This form of the invention differs from that first described in that the spring structure is of a different leverage character. This form of the invention, similar to that previously described, is not only reversible but is collapsible.

The term "opening" as used herein, except for openings 16 and 116 is intended to include a recess as well as an opening extending entirely through the opening provided member. The term "pin" as used herein is intended to include a pin mounted in the supporting member or formed as an integral part thereof.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a reversible scissors having a pair of two edge cutting blade members and a pair of handle members, the combination of a single pivotal means simultaneously connecting the blade members together and each handle member to its blade member, one member of one like pair of members including a pin parallel to the pivotal axis, one member of the other pair of like members including a pair of recesses, each equidistant from the pivotal axis of the pin and parallel to the pivotal axis and arcuately spaced apart sufficient for selective blade-member association, said pin being selectively seatable in either of the recesses and normally prevented from moving from one toward the other by the member stock therebetween.

2. In a reversible scissors having a pair of two edge cutting blade members and a pair of handle members, the combination of a single pivotal means simultaneously connecting the blade members together and each handle member to its blade member, one member of one like pair of members including a pin parallel to the pivotal axis, one member of the other pair of like members including a pair of recesses, each equidistant from the pivotal axis of the pin and parallel to the pivotal axis and arcuately spaced apart sufficient for selective blade-member association, said pin being selectively seatable in either of the recesses and normally prevented from moving from one toward the other by the member stock therebetween, each recess provided member including another recess parallel to the pivotal axis and equidistant therefrom for pin reception upon handle and blade member collapse.

3. In a reversible scissors having a pair of two edge cutting blade members and a pair of handle members, the combination of a single pivotal means simultaneously connecting the blade members together and each handle member to its blade member, one member of one like pair of members including a pin parallel to the pivotal axis, one member of the other pair of like members including a pair of recesses, each equidistant from the pivotal axis of the pin and parallel to the pivotal axis and arcuately spaced apart sufficient for selective blade-member association, said pin being selectively seatable in either of the recesses and normally prevented from moving from one toward the other by the member stock therebetween, each recess provided member including another and oppositely positioned recess parallel to the pivotal axis and equidistant therefrom for pin reception upon handle and blade member collapse, and dual spring means coaxially and operatively associated with opposite ends of the pivotal single means and bearing upon the adjacent handle member for axial "play" elimination between members.

4. In a reversible scissors having a pair of two edge cutting blade members and a pair of handle members, the combination of a single pivotal means simultaneously connecting the blade members together and each handle member to its blade member, one member of one like pair of members including a pin parallel to the pivotal axis, one member of the other pair of like members including a pair of recesses, each equidistant from the pivotal axis of the pin and parallel to the pivotal axis and arcuately spaced apart sufficient for selective blade-member association, said pin being selectively seatable in either of the recesses, and spring means operatively associated with the pivotal means for axial "play" elimination between members, said spring means including opposed leaf springs anchored at and by the pin.

5. In a reversible scissors having a pair of two edge cutting blade members and a pair of handle members, the combination of a single pivotal means simultaneously connecting the blade members together and each handle member to its blade member, one member of one like pair of members including a pin parallel to the pivotal axis, one member of the other pair of like members including a pair of recesses, each equidistant from the pivotal axis of the pin and parallel to the pivotal axis and arcuately spaced apart sufficient for selective blade-member association, said pin being selectively seatable in either of the recesses, each recess provided member including another and oppositely positioned recess parallel to the pivotal axis and equidistant therefrom for pin reception upon handle and blade member collapse, and spring means operatively associated with the pivotal means for axial "play" elimination between members, said spring means including opposed leaf springs anchored at and by the pin.

6. In a reversible scissors having a pair of two edge cutting blade members and a pair of handle members, the combination of a single pivotal means simultaneously connecting the blade members together and each handle member to its blade member, one member of one like pair of members including a pin parallel to the pivotal axis, one member of the other pair of like members including a pair of recesses, each equidistant from the pivotal axis of the pin and parallel to the pivotal axis and arcuately spaced apart sufficient for selective blade-member association, said pin being selectively seatable in either of the recesses, each recess provided member including another and oppositely positioned recess parallel to the pivotal axis and equidistant therefrom for pin reception upon handle and blade member collapse, and spring means operatively associated with the pivotal means for axial "play" elimination between members, said spring means including opposed leaf springs and anchored by the pivotal means.

7. In a reversible scissors having a pair of two edge cutting blade members and a pair of handle members, the combination of a single pivotal means simultaneously connecting the blade members together and each handle member to its blade member, one member of one like pair of members including a pin parallel to the pivotal axis, one member of the other pair of like members including a pair of recesses, each equidistant from the pivotal axis of the pin and parallel to the pivotal axis and arcuately spaced apart sufficient for selective blade-member association, said pin being selectively seatable in either of the recesses, each recess provided member including another and oppositely positioned recess parallel to the pivotal axis and equidistant therefrom for pin reception upon handle and blade member collapse, and spring means operatively associated with the pivotal means for axial "play" elimination between members, said spring means including opposed leaf springs anchored at and by the pin and anchored by the pivotal means.

ELLSWORTH WILLIAMS.